(12) United States Patent
Bricout et al.

(10) Patent No.: US 8,317,911 B2
(45) Date of Patent: Nov. 27, 2012

(54) USE OF SOLVENTS DERIVED FROM RENEWABLE RESOURCES, PAINTS AND COATING INCLUDING THEM, METHOD FOR PREPARING THEM

(75) Inventors: Xavier Bricout, Voisins le Bretonneux (FR); Michel Chappat, Maurepas (FR); Christine Deneuvillers, Maurepas (FR); Stéphane Harnois, Guyancourt (FR)

(73) Assignee: Colas, Boulogne Billancourt (FR)

( * ) Notice: Subject to any disclaimer, the term of this patent is extended or adjusted under 35 U.S.C. 154(b) by 811 days.

(21) Appl. No.: 12/370,804

(22) Filed: Feb. 13, 2009

(65) Prior Publication Data

US 2009/0211486 A1 Aug. 27, 2009

(30) Foreign Application Priority Data

Feb. 13, 2008 (FR) ...................................... 08 50918

(51) Int. Cl.
*C07C 59/00* (2006.01)

(52) U.S. Cl. ...................... 106/7; 106/6; 106/14; 106/31
(58) Field of Classification Search .......................... None
See application file for complete search history.

(56) References Cited

U.S. PATENT DOCUMENTS

| | | | |
|---|---|---|---|
| 2002/0007080 A1* | 1/2002 | Thames et al. | 554/219 |
| 2003/0229168 A1* | 12/2003 | Borsinger et al. | 524/275 |
| 2005/0081751 A1* | 4/2005 | Mauchamp et al. | 106/148.1 |

* cited by examiner

*Primary Examiner* — Melvin C Mayes
*Assistant Examiner* — Colette Nguyen
(74) *Attorney, Agent, or Firm* — Young & Thompson

(57) ABSTRACT

The invention relates to application of solvent(s) to a product including at least one binder, wherein the product is a paint or coating formulation and the solvent is a compound of renewable vegetable origin, notably agricultural origin. It also relates to a paint or coating including at least one binder and one solvent, wherein the solvent is of renewable vegetable origin. Formulations are given.

16 Claims, No Drawings

USE OF SOLVENTS DERIVED FROM RENEWABLE RESOURCES, PAINTS AND COATING INCLUDING THEM, METHOD FOR PREPARING THEM

The present invention relates to uses (applications) of solvents derived from renewable resources, and especially in products such as paints (including varnishes) or coatings, as well as a method for preparing them. By the way, these solvents can be referred to as "bio-solvents". The invention can especially be applied to road-marking paints or coatings.

Solvents are used in a lot of industries, notably in the sector of paints, coatings, inks, adhesives and glues. By way of examples of formulations, those described in U.S. Pat. No. 6,011,097, U.S. Pat. No. 5,948,849 or U.S. Pat. No. 4,923,760 can be mentioned.

Among the families of products using solvents, paints are the main ones. Their preparation involves techniques used in parachemistry: dissolution, mixing and kneading, then dispersion and filtration operations are implemented in the industrial process of preparation. These products are complex mixtures of many components. These components can be classified into four main families:

binders: they are the most important components and they are generally classified according to their chemical nature (alkyd, acrylic, styrene-acrylic . . . ).

additives: they are incorporated to modify characteristics of the formulation or to provide new properties.

pulverulent matters: pigments (providing opacity, colour, anti-corrosion, flame-retardant properties . . . ) and fillers (providing mechanical reinforcement, gloss control . . . ).

solvents: they provide fluidity properties and enable preparation and use (application) of the product. Once these steps performed, so as to avoid losses of performance and durability in the final product, these solvents have to be fully eliminated in their solvent-form, essentially through evaporation or through crosslinking (siccative action). In the latter case, they are considered as taking part in the properties of the binder or as a plasticizer.

These solvents are generally combined together so as to obtain a trade-off between drying time, film opening, coatability and solubility of the binder. These solvents can fulfill other actions; especially they can act as a true solvent which solubilizes a polymer; as a latent solvent (non pure solvent) associated with a true solvent and not modifying behaviour thereof; as a thinner (non-solvent) serving to adjust the viscosity and serving as an application vehicle.

These solvents classically derive from petrochemical industry. The mostly used solvents are toluene, MEK, ethyl, butyl or isopropyl acetate, White Spirit . . . . However, these products suffer from a number of drawbacks and especially a very important contribution to the production of Volatile Organic Components (VOC), which are prejudicial to the persons exposed thereto and to environment.

One of the objects of the invention is to provide a solution for preparing such products, which notably avoids this type of drawbacks. The invention essentially consists in using solvents derived from renewable resources of vegetable or animal origin (including agricultural, silvicultural and aquacultural origins), as opposed to the products derived from petrochemistry, and more generally of non-renewable origin, as substitutes for solvents of petrochemical origin in formulations of paints, inks, varnishes, adhesives or glues, whether the binder is of vegetable or petrochemical origin. According to this principle, two technical characteristics are mainly considered:—first, the use of solvents derived from renewable resources and preferably with reduced VOC levels (those solvents allowing the film to be dried by evaporation);—second, the use of siccative oils as a solvent so that the solvent takes part, through crosslinking, to the cohesion and properties of the film (those solvents staying retained in the film).

Among the advantages of this type of solvent, it can be mentioned that they are generally biodegradable and non toxic, and that they are renewable, notably because they derive from agriculture (they are then called "agro-solvents", and include the resources derived from farming/breeding, forestry and aquaculture). They also have a high solvent power, and take part in the carbon cycle, unlike the products of petroleum origin. Finally, in a surprising manner, this type of solvent can be compatible with the other compounds of petrochemical origin that can be found in the considered products.

Consequently, the present invention first relates to application of solvent(s) to a product comprising at least one binder.

According to the present invention, the obtained product is a paint (including varnish) or coating formulation, and the solvent(s) are compounds derived from renewable resources of vegetable or animal origin, and preferably of agricultural vegetable origin, including silvicultural and aquacultural origin (renewing naturally or through planting/breeding), the binder being chemically inert in the formulation and the solvent(s) taking part in the setting of the paint or coating through evaporation or through siccative action according to the case, while being compatible with the rest of the formulation.

Within the context of the invention, saying that the binder is chemically inert means that it does not crosslink.

In various embodiments of the present invention, the following means are used, which can be used alone or in any technically possible combination:

application to an initial paint or coating formulation, which is a list of ingredients of a mixture comprising at least one solvent of petrochemical origin, and consisting in preparing the paint or coating once again by substituting (replacing and adapting) the solvent(s) of petrochemical origin of the initial formulation by at least one compound derived from renewable resources of vegetable or animal origin, and preferably of agricultural vegetable origin, including silvicultural and aquacultural origin (renewing naturally or through planting/breeding), said substitutive solvent(s) being compatible with the rest of the formulation comprising one or more inert binders, application to an initial paint or coating formulation, which is a concrete mixture of ingredients comprising at least one solvent of petrochemical origin, and consisting in removing from said mixture the solvent(s) of petrochemical origin and in substituting (replacing and adapting) the latter by at least one compound derived from renewable resources of vegetable or animal origin, and preferably of agricultural vegetable origin, including silvicultural and aquacultural origin (renewing naturally or through planting/breeding), said substitutive solvent(s) being compatible with the rest of the formulation comprising one or more inert binders, one or more binders of the initial paint (including varnish) or coating formulation is of petrochemical origin, and the binder(s) of petrochemical origin are further all substituted (replaced and adapted) by one or more inert binders of renewable origin, compatible with the rest of the formulation, the binder(s) of the initial formulation are vegetable binders, the binder of the obtained product is of agricultural vegetable origin, including silvicultural and aquacultural origin (renewing naturally or through planting/breeding), the binder of agricultural vegetable origin is chosen from rosin or modified rosin, the modified rosin is modified by esterification, preferably the esterified rosin is glycerol- or pentaerythritol-esterified (especially, DERTOLINE® G2L or P2L), preferably, the rosin has an acid value comprised between 140 and 300, preferably, the rosin has a softening point comprised between 60° C. and 150° C., the obtained product comprises a plasticizer (added at the time of application or, preferably, in the initial formulation), the plasticizer is a natural or modified oil or a mixture of several natural or modified oils, derived from renewable resources of vegetable or animal origin, and preferably of agricultural vegetable origin, including silvicultural and aquacultural origin, the oil is a fish oil (especially, herring oil),
the oil is beef tallow,
the oil is spermaceti oil,
the oil is an oil of vegetable origin,
the oil is an oxidized oil,
the oil is a stand oil (an oil heated near its boiling point and polymerized), the natural vegetable oil is chosen among: soya bean, linseed, sunflower, rapeseed, grape-seed, peanut, olive, canola, safflower, coconut, wheat germ, corn, walnut, almond, palm, sesame, china-wood or "tung", castor, cottonseed oils, and their mixtures, the vegetable oil is a vegetable-oil derivative or a mixture of vegetable-oil derivatives such as fatty acids, fatty alcohols, fatty acid esters, chemically modified fatty acid esters, the fatty acid ester(s) are obtained through transesterification of vegetable oils with an alcohol, the preferred fatty acid ester(s) are fatty acid triglyceride esters (glycerin esterified by fatty acid molecules) and contain unsaturations, the triglyceride(s) are obtained by trituration of seeds and extraction of oil (hydrolysis thereof leads to the glycerol and to fatty acids), the fatty acid(s) are aliphatic monoacids, the fatty acid(s) are monocarboxylic with 6 to 24 carbon atoms, dicarboxylic with 12 to 48 carbon atoms and/or tricarboxylic(s) with 18 to 72 carbon atoms, saturated or unsaturated fatty acids, preferably, the fatty acid(s) are the linoleic acid and the linolenic acid, the obtained product comprises one or more pigments (added at the time of application or, preferably, in the initial formulation), among the pigments, mineral pigments such as the metal oxides, for example titanium oxide, iron oxides, and synthetic or natural organic pigments, such as azo pigments and naphtols, and their mixtures, can be mentioned, still among the pigments, pigments of agricultural, silvicultural or aquatic vegetable (or even animal) origin, such as dyer's madder (*Rubia tinctorum* L.), reseda or weld (*Reseda luteola* L.), dyer's greenweed (*Genista tinctoria* L.), Canada goldenrod (*Solidago canadensis* L.), yellow cosmos (*Cosmos sulphureus* Cav.), dyer's calliopsis (*Coreopsis tinctoria* Nutt.), dyer's sorghum (*Sorghum bicolor* (L.) Moench.), woad indigo (*Isatis tinctoria* L.), logwood (*Haematoxylon campechianum* L.), Brasil or Pernambuco wood (*Caesalpinia echinata* Lam.), quebracho (*Schinopsis lorentzii* Engl.), gambier (*Uncaria gambir* Roxb.), sweet chestnut (*Castanea sativa* L.), or indigo (*Indigofera anil* L.) or else buckthorn, chlorophyll, cochineal, mirobalan, gall nut, genipa or softwood, can be mentioned, the obtained product comprises one or more filler(s) (added at the time of application or, preferably, in the initial formulation) and, among the fillers usable for the present invention, earth alkali carbonates such as calcium carbonate, silica, glass powder or balls (hollow or not), polymers with microvoids, marble powder and aggregates, chalk, talc, dolomite and "extenders" (silicates, sulphates, wollastonites, aluminosilicates, aluminium hydrate), etc., and their mixtures, can be mentioned, the obtained product comprises additives, especially chosen among dispersants, thickeners, antifoaming agents (added at the time of application or, preferably, in the initial formulation), the solvent of the obtained product is chosen among one or more of the following compounds:

vegetable solvents of the following types: methyl esters, chemically modified methyl esters, ethyl esters, propyl esters, C1-C10 alcohol-based esters, C4-C30 fatty chains-based esters, vegetable oils, especially rapeseed, coconut, palm, sunflower oils, as well as their derivatives, especially oxidized, unsaturated or standolized ones, so-called "green" acetates, and especially ultrapure ethylol or pure methylol from Lambiotte, cleaning products derived from terpene, bioethanol, terpenic alcohols that are not considered as Volatile Organic Components, diacid esters, derivatives of limonene, etheresters, the solvent of the obtained product has been chosen so as to evaporate from said product, application to a paint or coating comprising:
a vegetable binder, which is rosin or a derivative thereof, preferably an esterified rosin, especially a glycerol- or pentaerythritol-esterified rosin (for example, DERTOLINE® G2L or P2L),
a vegetable-oil vegetable plasticizer, which is preferably linseed oil,
a vegetable solvent, which is preferably BIOETHANOL®,
a pigment, which is preferably titanium oxide+natural ochre,
a filler, which is preferably calcium carbonate, and
additives, which are especially dispersants and thickeners,
application to a paint or coating comprising:
between 10% and 20% of a vegetable binder (preferably pentaerythritol-esterified rosin), and preferably 16%,
between 1% and 5% of a vegetable-oil plasticizer (preferably linseed oil), and preferably 3%,
between 10% and 30% of a vegetable solvent (preferably BIOETHANOL®), and preferably 19%,
between 0 and 30% of a pigment (preferably titanium oxide+natural ochre, at the rate of 11% and 6%, respectively), and preferably 17%,
between 20% and 50% of a filler (preferably calcium carbonate), and preferably 44%, and
between 0.1% and 10% of additives (especially dispersants and thickeners, preferably at the rate of 0.5% each), and preferably 1%,
the percentages being in weight,
the solvent of the obtained product has been chosen so as to stay in said product by crosslinking (=siccative, leading to a mass polymerization),
application to a paint or coating comprising:
a vegetable binder, which is rosin or a derivative thereof, preferably an esterified rosin, especially a glycerol- or pentaerythritol-esterified rosin (for example, DERTOLINE® G2L or P2L),
a vegetable-oil vegetable plasticizer, which is preferably rapeseed oil, a vegetable solvent, which is preferably a vegetable oil (for example, the product VEGEFLUX® produced by the COLAS® company), a pigment, which is preferably titanium oxide, a filler, which is preferably calcium carbonate, and additives, which are especially dispersants and thickeners, application to a paint or coating comprising:

between 10% and 20% of a vegetable binder (preferably pentaerythritol-esterified rosin), and preferably 14%, between 1% and 5% of a vegetable-oil plasticizer, preferably rapeseed oil, at the rate of 2%, between 10% and 30% of a vegetable-oil vegetable solvent (preferably VEGEFLUX®), and preferably 22%, between 0 and 30% of a pigment (preferably titanium oxide), and preferably 17%, between 20% and 50% of a filler (preferably calcium carbonate), and preferably 44%, and between 0.1% and 15% of additives (especially dispersants and thickeners, preferably at the rate of 0.5% each), and preferably 1%, the percentages being in weight.

As for the plasticizer, the following characteristics are also considered within the scope of the invention:

Preferably, the fatty acids are isolated or derived from a vegetable oil chosen among natural vegetable oils and modified vegetable oils, and for example among: soya bean, linseed, sunflower, rapeseed, grape-seed, peanut, olive, canola, safflower, coconut, wheat germ, corn, walnut, almond, palm, sesame oils, and their mixtures.

By way of example, the linear saturated fatty acids can be chosen among: caproic, caprylic, capric, lauric, myristic, palmitic, margaric, stearic, arachidic, behenic and lignoceric acids.

By way of example, the monocarboxylic unsaturated fatty acids can be chosen among: palmitoleic, oleic, vaccenic, linoleic, linolenic, arachidonic, eicosapentaenoic, erucic, docosahexaenolic, nervonic and nonanonic acids.

The above-described fatty acids are monocarboxylic fatty acids usable for implementing the present invention.

Fatty acids also usable for implementing the present invention are polymerized fatty acids that comprise more than one carboxylic function and that are, for example, dimer or trimer fatty acids.

By way of example of dimer dicarboxylic fatty acids also usable for preparing a basic binder according to the invention, it can be mentioned the saturated or unsaturated, preferably unsaturated, fatty acids having 12 to 48 carbon atoms, and especially the unsaturated fatty acid having 18 carbon atoms, the CAS reference of which is 61788-89-4.

Finally, by way of example of trimer tricarboxylic fatty acids usable for preparing a basic binder according to the invention, it can be mentioned the saturated or unsaturated, preferably unsaturated, fatty acids having 18 to 72 carbon atoms, and especially the unsaturated fatty acid having 18 carbon atoms, the CAS reference of which is 68937-90-6.

The invention also relates to a paint (including varnish) or coating comprising at least one binder and at least one solvent in its formulation.

According to the present invention, the solvent(s) are compounds derived from renewable resources of vegetable or animal origin, and preferably of agricultural vegetable origin, including silvicultural and aquacultural origin (renewing naturally or through planting/breeding), the binder being chemically inert in the formulation and the solvent(s) taking part in the setting of the paint or coating through evaporation or through siccative action according to the case, while being compatible with the rest of the formulation.

In various embodiments of the present invention, the following means are used, which can be used alone or in any technically possible combination:

the paint or coating comprises between 10% and 20% of at least one inert binder, between 1% and 5% of at least one plasticizer, between 10% and 30% of the solvent(s), between 0.1% and 10% of additives, and between 20% and 80% of filler(s) and possible pigment(s), the percentages being in weight, the paint or coating further comprises a latex, said latex constituting up to 20% of the paint or coating, the percentages of filler(s) and possible pigment(s) being accordingly reduced, the vegetable solvent is chosen among one or more of the following compounds:

vegetable solvents of the following types: methyl esters, chemically modified methyl esters, ethyl esters, propyl esters, C1-C10 alcohol-based esters, C4-C30 fatty chains-based esters, vegetable oils, especially rapeseed, coconut, palm, sunflower oils, as well as their derivatives, especially oxidized, unsaturated or standolized ones, so-called "green" acetates, and especially ultrapure ethylol or pure methylol from Lambiotte, cleaning products, bioethanol, terpenic alcohols that are not considered as Volatile Organic Components, diacid esters, derivatives of limonene, etheresters, the binder is of petrochemical origin, the binder comprises at least one product of petrochemical origin, the binder is of agricultural vegetable origin, including silvicultural and aquacultural origin (renewing naturally or through planting/breeding), the binder of agricultural vegetable origin is chosen among rosin or modified rosin, the modified rosin is modified by esterification, preferably the esterified rosin is glycerol- or pentaerythritol-esterified (especially, DERTOLINE® G2L or P2L), preferably, the rosin has an acid value comprised between 140 and 300, preferably, the rosin has a softening point comprised between 60° C. and 150° C., the plasticizer is a natural or modified oil or a mixture of several natural or modified oils, derived from renewable resources of vegetable or animal origin, and preferably of agricultural vegetable origin, including silvicultural and aquacultural origin, the oil is a fish oil (especially, herring oil), the oil is beef tallow, the oil is spermaceti oil, the oil is an oil of vegetable origin, the oil is an oxidized oil, the oil is a stand oil (an oil heated near its boiling point and polymerized), the natural vegetable oil is chosen among: soya bean, linseed, sunflower, rapeseed, grape-seed, peanut, olive, canola, safflower, coconut, wheat germ, corn, walnut, almond, palm, sesame, china-wood or "tung", castor, cottonseed oils, and their mixtures, the vegetable oil is a vegetable-oil derivative or a mixture of vegetable-oil derivatives such as fatty acids, fatty alcohols, fatty acid esters, chemically modified fatty acid esters, the fatty acid ester(s) are obtained through transesterification of vegetable oils with an alcohol, the preferred fatty acid ester(s) are fatty acid triglyceride esters (glycerin esterified by fatty acid molecules) and contain unsaturations, the triglyceride(s) are obtained by trituration of seeds and extraction of oil (hydrolysis thereof leading to the glycerol and to fatty acids), the fatty acid(s) are aliphatic monoacids, the fatty acid(s) are monocarboxylic with 6 to 24 carbon atoms, dicarboxylic with 12 to 48 carbon atoms and/or tricarboxylic(s) with 18 to 72 carbon atoms, saturated or unsaturated fatty acids, preferably, the fatty acid(s) are the linoleic acid and the linolenic acid, preferably, the fatty acids are isolated or derived from a vegetable oil chosen among natural vegetable oils and modified vegetable oils, and for example among: soya bean, linseed, sunflower, rapeseed, grape-seed, peanut, olive, canola, safflower, coconut, wheat germ, corn, walnut, almond, palm, sesame oils, and their mixtures, the linear saturated fatty acids can be chosen among: caproic, caprylic, capric, lauric, myristic, palmitic, margaric, stearic, arachidic, behenic and lignoceric acids, the monocarboxylic unsaturated fatty acids can be chosen among: palmitoleic, oleic, vaccenic, linolieic, linolenic, arachidonic, eicosapentaenoic, erucic, docosahexaenolic, nervonic and nonanonic acids, the above-defined fatty acids are monocarboxylic fatty acids usable for implementing the present invention, the fatty acids also usable for implementing the present invention are polymerized fatty acids that comprise more than one carboxylic function and that are, for example, dimer or trimer fatty acids, by way of example of dimer dicarboxylic fatty acids also usable for preparing a basic binder according to the invention, the saturated or unsaturated, preferably unsaturated, fatty acids having 12 to 48 carbon atoms, and especially the unsaturated fatty acid having 18 carbon atoms, the CAS reference of which is 61788-89-4, can be mentioned.

by way of example of trimer tricarboxylic fatty acids usable for preparing a basic binder according to the invention, the saturated or unsaturated, preferably unsaturated, fatty acids having 18 to 72 carbon atoms, and especially the unsaturated fatty acid having 18 carbon atoms, the CAS reference of which is 68937-90-6, can be mentioned.

the pigments are chosen among mineral pigments such as the metal oxides, for example titanium oxide, iron oxides, and synthetic or natural organic pigments, such as azo pigments and naphtols, and their mixtures, or else, one or more other pigments, including those above-mentioned or others, such as for example: ochres, sienna, black earth pigments (especially with manganese oxide), green earth pigments (especially with iron protoxides), English red, lapis-lazuli, malachite green, azurite, sunflower blue, vine black, carotene, lycopene, the fillers are chosen among earth alkali carbonates such as calcium carbonate, silica, glass powder or balls, marble powder and aggregates, chalk, talc, etc., and their mixtures, the additives are chosen among dispersants, thickeners, antifoaming agents, all the compounds of the paint or coating formulation are derived from renewable resources of vegetable or animal origin, and preferably of agricultural vegetable origin, including silvicultural and aquacultural origin, the vegetable solvent is intended to evaporate, the paint or coating comprises:

a vegetable binder, which is rosin or modified rosin, preferably an esterified rosin, especially a glycerol- or pentaerythritol-esterified rosin (for example, DERTOLINE® G2L or P2L), a vegetable-oil vegetable plasticizer, which is preferably linseed oil, a vegetable solvent, which is preferably BIOETHANOL®, a pigment, which is preferably titanium oxide+natural ochre, a filler, which is preferably calcium carbonate, and additives, which are especially dispersants and thickeners, the paint or coating comprises:

between 10% and 20% of a vegetable binder (preferably pentaerythritol-esterified rosin), and preferably 16%, between 1% and 5% of a vegetable-oil plasticizer (preferably linseed oil), and preferably 3%, between 10% and 30% of a vegetable solvent (preferably BIOETHANOL®), and preferably 19%, between 0 and 30% of a pigment (preferably titanium oxide+natural ochre, at the rate of 11% and 6%, respectively), and preferably 17%, between 20% and 50% of a filler (preferably calcium carbonate), and preferably 44%, and between 0.1% and 10% of additives (especially dispersants and thickeners, preferably at the rate of 0.5% each), and preferably 1%, the percentages being in weight, the vegetable solvent is intended to stay in the paint or coating by crosslinking (=siccative action, leading to a mass polymerization), the paint or coating comprises:

a vegetable binder, which is rosin or modified rosin, preferably an esterified rosin, especially a glycerol- or pentaerythritol-esterified rosin (for example, DERTOLINE® G2L or P2L), a vegetable plasticizer, which is a vegetable oil, preferably rapeseed oil, a vegetable solvent, which is preferably a vegetable oil (for example, the product VEGEFLUX® produced by the COLAS® company), a pigment, which is preferably titanium oxide, a filler, which is preferably calcium carbonate, and additives, which are especially dispersants and thickeners, the paint or coating comprises:

between 10% and 20% of a vegetable binder (preferably pentaerythritol-esterified rosin), and preferably 14%, between 1% and 5% of a vegetable-oil plasticizer (preferably rapeseed oil), at the rate of 2%, between 10% and 30% of a vegetable-oil vegetable solvent (preferably VEGEFLUX®), and preferably 22%, between 0 and 30% of a pigment (preferably titanium oxide), and preferably 17%, between 20% and 50% of a filler (preferably calcium carbonate), and preferably 44%, and between 0.1% and 10% of additives (especially dispersants and thickeners, preferably at the rate of 0.5% each), and preferably 1%, the percentages being in weight.

The invention also relates to a method for preparing a composition of the paint or coating type from a formulation, the formulation comprising at least one solvent of petrochemical origin, in which the solvent(s) of petrochemical origin are substituted by at least one solvent derived from renewable resources of vegetable or animal origin, and preferably of agricultural vegetable origin, including silvicultural and aquacultural origin, the solvent being compatible with the rest of the formulation.

According to a variant of the method, a formulation is provided, which comprises at least one binder (of petrochemical origin or derived from renewable resources; and thus the prepared composition, although having one or more vegetable solvents, can comprise petrochemical binders), said binder being chemically inert in the formulation and the solvent(s) derived from renewable resources taking part in the setting of the composition through evaporation or through siccative action according to the case.

According to another variant of the method, a formulation is provided, which comprises at least one binder of petrochemical origin, said binder being chemically inert in the formulation and the binder(s) of petrochemical origin is substituted by at least one binder derived from renewable resources of vegetable or animal origin, and preferably of agricultural vegetable origin, including silvicultural and aquacultural origin, said binder being compatible with the rest of the formulation.

Finally, the present invention relates to a composition of the paint or coating type, specifically obtained by the method and the above-mentioned variants thereof.

The present invention will now be exemplified, without thereby being limited, by the following description of embodiments.

The application examples provided herein essentially relates to products of the paint or coating type, and the vegetable solvent is used in replacement of solvents of petrochemical origin in classical, or modified, formulations of these products, or else in new specific formulations.

By way of example of a classical formulation, a usual solvented paint essentially comprises a binder (acrylic or styrene-acrylic) of petrochemical origin, pigments (organic or mineral), fillers (natural, silica-based, limestone-based . . . ), additives (including: dispersant, plasticizer, thickener, fungicide . . . ), and a solvent of petrochemical origin (toluene, MEK, ethyl, butyl or isopropyl acetate, White Spirit . . . ).

Among the solvents considered in the scope of the present invention to be used in the considered products, it can be mentioned:

the vegetable solvents of the following types: methyl esters, chemically modified methyl esters, ethyl esters, propyl esters . . . , all the C1-C10 alcohol-based esters, C4-C30 fatty chains-based esters, and vegetable oils (rapeseed, coconut, palm, sunflower oils . . . ), as well as their derivatives (oxidized, unsaturated or standolized . . . ).

so-called "green" acetates, as ultrapure ethylol or pure methylol from Lambiotte, cleaning products (DEXCEL® bio 3000 of MMCC), bioethanol, terpenic alcohols (not considered as VOC), diacid esters, derivatives of limonene, etheresters . . . .

the mixtures, in any proportions, of the above compounds.

These pure solvents and products can be classified into two main categories: the first one consisting of "light" solvents formed with small molecules (and that rather tend to evaporate), and the second one consisting of "heavy" solvents (that rather stay in situ and are then siccative solvents), including oils, mainly formed with high molecular weight molecules. A molecule is considered as being small when its carbon chain has 1 to 8 carbon atoms.

In the framework of application to a paint formulation, the following known paint formulation (Lilas 2B) is considered, which comprises a solvent of petrochemical origin and an inert binder: 16.45% of methylethyketone (in two additions: 14.55%, then 1.9%), 8% of butyl acetate (in two additions: 5.55%, then 2.45%), 0.51% of a thickener (BYK 204®), 0.5% of amorphous silica (CABOSIL M5®), 13.18% of n-butylmethacrylate resin/MMA (DEGALAN LP64/12®), 5% of chlorinated paraffin (CERECLOR M50®), 14.55% of titanium oxide, 41.82% of calcium carbonate (DURCAL 5®), the analysis of the formulation giving a solids content of 75%, a ash content of 37%, a specific gravity of 1.6 and a viscosity of 77KU (Krebs Unit method, according to the standard ASTM D562) for 120/160 s.

The dispersant BYK 204® comprises a high molecular weight compound and is normally intended for paints in solvent phase. It is more precisely a solution of polycarboxylic acid polyamine-amide salt having an amine value of 37 mgKOH/g, an acid value of 41 mgKOH/g, a specific gravity of 0.93, a solids content of 52%, a flash point of 31° C., and the solvent of which is a 3/2 mixture of methoxypropanol/alkylbenzene.

From this known formulation, the application of the present invention with substitution (replacement and adaptation of the non renewable compound(s) by one or more renewable compounds), gives, for example, the following resulting formulation (the percentages being in weight):

24.5% of VEGEFLUX® of the COLAS® company, 0.51% of a thickener (BYK 204®), 0.5% of amorphous silica (CABOSIL M5®), 13.18% of n-butylmethacrylate resin/MMA (DEGALAN LP64/12®), 5% of chlorinated paraffin (CERECLOR M50®), 14.55% of titanium oxide, and 41.82% of calcium carbonate (DURCAL 5®), the analysis of the formulation giving a solids content of 75%, a ash content of 37%, a specific gravity of 1.6 and a viscosity of 77KU for 120/160 s.

It is to be noted that it is also possible to substitute the binder of petrochemical origin by a binder of renewable origin, and especially a vegetable one, having for instance the following formulation: 16.45% of methylethyketone (in two additions: 14.55%, then 1.9%), 8% of butyl acetate (in two additions: 5.55%, then 2.45%), 0.51% of a thickener (BYK 204®), 0.5% of amorphous silica (CABOSIL M5), 10.54% of pentaerythritol-esterified rosin (DERTOLINE® P2L), 5% of chlorinated paraffin (CERECLOR M50®), 14.55% of titanium oxide, 2.45% of butyl acetate, 41.82% of calcium carbonate (DURCAL 5®), and 2.64% of soya oil, the analysis of the formulation giving a solids content of 75%, a ash content of 37%, a specific gravity of 1.6 and a viscosity of 77KU for 120/160 s.

It is recognized that it is also possible to make a double substitution of the solvent(s) and binder(s) of petrochemical origin (more generally, non renewable) by solvent(s) and binder(s) of renewable origin.

Now, in the framework of the use of a binder of vegetable origin with crosslinking (siccative action) of the vegetable solvent, the following first paint formulation has been tested: vegetable binder (14% of pentaerythritol-esterified rosin: DERTOLINE® P2L), vegetable plasticizer (2% of refined rapeseed oil), vegetable solvent (22% of VEGEFLUX®), pigment (17% of titanium oxide), filler (44% of calcium carbonate), and additives (0.5% of dispersant BYK 204® and 0.5% of silica-based thickener, for example CABOSIL®), the approximate percentages being in weight.

The following table shows in details this composition:
Paint #1 (mass polymerization)

| | Nature of the product | Trade Name | Supplier | Percentage by mass |
|---|---|---|---|---|
| Vegetable binder | pentaerythritol-esterified rosin | DERTOLINE P2L | DRT | 14 |
| Vegetable plasticizer | Vegetable oil | Refined rapeseed oil | Cognis | 2 |
| Vegetable solvent | Vegetable oil | VEGEFLUX | Ecoliant | 22 |
| Pigment | Titanium oxide | TITANPOL R-001 | ZschPolice | 17 |
| Fillers | Calcium carbonate | DURCAL 5 | Omya | 44 |
| Paint additives | Dispersant | BYK 204 | Byk Chemie | 0.5 |
| | Thickener | CABOSIL | Cabot Corporation | 0.5 |
| | | TOTAL | | 100 |

This first paint crosslinkable, good film-forming formulation allows a hardening of the film, related to the climatic conditions, of the order of a few hours when the film is spray-coated as thin layers (about 400 to 600 g/m$^2$ of wet paint), without adding additional siccative agents. The measured viscosity after 24 h is equal to 82KU at 21° C. Among the advantages thereof, it can be mentioned a (quasi) absence of solvent release (very low VOC).

In the framework of the use of a binder of vegetable origin with evaporation of the vegetable solvent, the following second paint formulation has been tested: vegetable binder (16% of glycerin-esterified rosin: DERTOLINE® G2L), vegetable plasticizer (3% of refined linseed oil), vegetable solvent (19% of BIOETHANOL®), pigment (11% of titanium oxide and 6% of natural ochre), filler (44% of calcium carbonate), and additives (0.5% of dispersant BYK 204® and 0.5% of silica-based thickener, for example CABOSIL®), the approximate percentages being in weight.

The following table shows in details this composition: Paint #2 (evaporation)

| | Nature of the product | Trade Name | Supplier | Percentage by mass |
|---|---|---|---|---|
| Vegetable binder | glycerin-esterified rosin | DERTOLINE G2L | DRT | 16 |
| Vegetable plasticizer | Vegetable oil | Refined linseed oil | VdP | 3 |
| Vegetable solvent | Ethanol of vegetable origin | BIOETHANOL | UNGDA laboratory | 19 |
| Pigment | Titanium oxide natural ochre | TITANPOL R-001 Havana ochre | ZschPolice Maison de l'écologie | 11 |
| Fillers | Calcium carbonate | DURCAL 5 | Omya | 44 |
| Paint additives | Dispersant | BYK 204 | Byk Chemie | 0.5 |
| | Thickener | CABOSIL | Cabot Corporation | 0.5 |
| | | TOTAL | | 100 |

This second paint evaporable, good film-forming formulation allows a hardening of the film, related to the climatic conditions, of the order of a few dozens of minutes when the film is spray-coated as thin layers. The measured viscosity after 24 h is equal to 83KU at ambient temperature. Among the advantages thereof, it can be mentioned a fast drying.

Physical and physicochemical characteristics of the two preceding paint formulations are given in the following table:

| | Method | Paint #1 | Paint #2 |
|---|---|---|---|
| Dry content | NF EN ISO 3251 | 98% | 85% |
| Ash content | NF T 30-012 | 65% | 63% |
| Brookfield viscosity (RV4/10 RPM) | ISO 2555 | 3800 mPa·s | 3040 mPa·s |
| Brookfield viscosity (RV4/100 RPM) | ISO 2555 | 760 mPa·s | 710 mPa·s |
| BK drying time | NF L 16-116 | 6 h | 4 h |
| Persoz Hardness (J + 1) | NF EN ISO 1522 | 10 s | 12 s |

It is recognized that the given values and proportions are indicative and that they can vary for each of the given examples, as well as for the preparation of other formulations within the scope of the present invention. In particular, in the case of a varnish, which is a filler-free composition, contemplated in the scope of the present invention, it is recognized that the filler percentage within the compositions can vary from 0 to several tens of percents, for example up to 80%, as described, the percentages of the other compounds being adapted according to the formulations.

The invention claimed is:

1. A paint, coating or varnish formulation comprising, by weight relative to the total weight of the formulation:
    from 10% to 20% of at least one binder derived from renewable resources of vegetable or animal origin, said at least one binder being chemically inert in the formulation;

from 1% to 5% of at least one plasticizer, which is one or more natural oils of renewable resources of vegetable or animal origin;

from 10% to 30% of at least one solvent derived from renewable resources of vegetable or animal origin, said solvent being compatible with other components of the formulation, said solvent taking part in setting the paint, coating or varnish through evaporation or through siccative action, and said solvent being one or more compounds selected from the group consisting of:

derivatives of oxidized, unsaturated or standolized compounds selected from the group consisting of methyl esters, chemically modified methyl esters, ethyl esters, propyl esters, $C_1$-$C_{10}$ alcohol based esters, $C_4$-$C_{30}$ fatty chain-based esters, and vegetable oils, and acetates selected from ultrapure ethylol or pure methylol from Lambiotte, cleaning products derived from terpene, bioethanol, terpenic alcohols that are not considered as Volatile Organic Components, diacid esters, derivatives of limonene, and etheresters;

from 0.1% to 10% of additives; and at least 20% of at least one filler or at least one filler and at least one pigment.

2. The paint, coating or varnish formulation according to claim 1, wherein said at least one binder is derived from agricultural vegetable origin.

3. The paint, coating or varnish formulation according to claim 2, wherein said at least one binder is derived from silvicultural or aquacultural origin.

4. The paint, coating or varnish formulation according to claim 2, wherein said at least one binder of agricultural vegetable origin is rosin or modified rosin.

5. The paint, coating or varnish formulation according to claim 4, wherein said modified rosin is glycerol- or pentaerythritol-esterified rosin.

6. The paint, coating or varnish formulation according to claim 1, wherein, the one or more natural oils of animal origin constituting said at least one plasticizer are selected from the group consisting of: fish oil, beef tallow, spermaceti and mixtures thereof, and the one or more natural oils of vegetable origin constituting said at least one plasticizer are selected from the group consisting of: soya bean, linseed, sunflower, rapeseed, grape-seed, peanut, olive, canola, safflower, coconut, wheat germ, corn, walnut, almond, palm, sesame, chinawood or tung, castor, cottonseed oils, and mixtures thereof.

7. The paint, coating or varnish formulation according to claim 6, wherein said at least one plasticizer is linseed oil or rapeseed oil.

8. The paint, coating or varnish formulation according to claim 1, wherein the derivatives of oxidized vegetable solvents is selected in the groups consisting of: rapeseed, coconut, palm, and sunflower oils.

9. The paint, coating or varnish formulation according to claim 1, wherein the formulation comprises at least 20% of at least one filler and at least one pigment, and wherein the at least one pigment selected from the group consisting of: mineral pigments, synthetic or organic pigments, ochres, sienna, black earth pigments, green earth pigments, English red, lapis-lazuli, malachite green, azurite, sunflower blue, vine black, carotene, lycopene and combinations thereof.

10. The paint, coating or varnish formulation according to claim 9, wherein the mineral pigments are metal oxide pigments selected from the group consisting of titanium oxide and iron oxides.

11. The paint, coating or varnish formulation according to claim 1, wherein said at least one filler is selected from the group consisting of earth alkali carbonates, silica glass powder or balls, marble powder and aggregatres, chalk, talc and mixtures thereof.

12. The paint, coating or varnish formulation according to claim 1, wherein said additives are selected from the group consisting of dispersants, thickeners, antifoaming agents and mixtures thereof.

13. The paint, coating or varnish formulation according to claim 12, comprising, relative to the total weight of the formulation:

16% of pentaerythritolesterified rosin as said at least one binder,

3% of linseed oil as said at least one plasticizer,

19% of ethanol as said at least one solvent, between 20% and 50% of calcium carbonate as said at least one filler, 0.5% of dispersants and 0.5% of thickeners as said additives, and between 0 and 30% of titanium oxide and natural ochre as pigments.

14. The paint, coating or varnish formulation according to claim 1, wherein said at least one binder is rosin or esterified rosin, said at least one plasticizer is linseed oil plasticizer, said at least one solvent is ethanol derived from renewable resources of vegetable origin, said additives are dispersants and thickeners, said at least one filler is calcium carbonate and at least one pigment comprises titanium oxide and natural ochre.

15. The paint, coating or varnish formulation according to claim 1, wherein said at least one binder is rosin or esterified rosin, rapeseed oil, said at least one plasticizer is rapeseed oil said at least one solvent is oxidized vegetable oil derived from renewable resources of vegetable origin, said additives are dispersants and thickeners, said at least one filler is calcium carbonate and said at least one pigment is titanium oxide.

16. The paint, coating or varnish formulation according to claim 1, comprising, by weight, relative to the total weight of the formulation:

14% of pentaerythritolesterified rosin as said at least one binder,

2% of rapeseed oil as said at least one plasticizer,

22% of a derivative of oxidized and esterified colza oil as said at least one solvent, 0.5% of dispersants and 0.5% of thickeners as said additives, between 20% and 50% of calcium carbonate as said at least one filler, and between 0 and 30% of titanium oxide as a pigment.

* * * * *